US006854475B2

United States Patent
Slabbert

(10) Patent No.: US 6,854,475 B2
(45) Date of Patent: Feb. 15, 2005

(54) HELICOPTER PROTECTION SYSTEM

(75) Inventor: Johan Herman Slabbert, Pretoria (ZA)

(73) Assignee: Peter Andrew Haley, Pretoria (ZA)

( * ) Notice: Subject to any disclaimer, the term of this patent is extended or adjusted under 35 U.S.C. 154(b) by 22 days.

(21) Appl. No.: 10/181,296
(22) PCT Filed: Jan. 9, 2001
(86) PCT No.: PCT/ZA01/00003
§ 371 (c)(1),
(2), (4) Date: Jul. 16, 2002
(87) PCT Pub. No.: WO01/52623
PCT Pub. Date: Jul. 26, 2001

(65) Prior Publication Data
US 2003/0000562 A1 Jan. 2, 2003

(51) Int. Cl.[7] .............................................. E04H 15/06
(52) U.S. Cl. ..................... 135/88.01; 135/96
(58) Field of Search ................. 135/96, 88.01, 135/88.03, 119, 120.1; 150/154, 157

(56) References Cited

U.S. PATENT DOCUMENTS

| 2,609,164 A | | 9/1952 | Dillon .................. 135/88.01 X |
| 3,044,516 A | * | 7/1962 | Stoll ............................ 150/166 |
| 4,613,096 A | | 9/1986 | Pugh ............................ 150/157 |
| 5,179,968 A | | 1/1993 | Deichmann ............... 135/88.01 |
| 5,273,399 A | * | 12/1993 | Ojeda ...................... 416/146 R |

* cited by examiner

Primary Examiner—James O. Hansen
(74) Attorney, Agent, or Firm—Young & Thompson

(57) ABSTRACT

A panel for use in a helicopter protection system which includes a cover made from a flexible sheet material, a safety shear strip which extends between two sections of the cover, and first and second attachment devices on respective first and second edges of the cover.

5 Claims, 2 Drawing Sheets

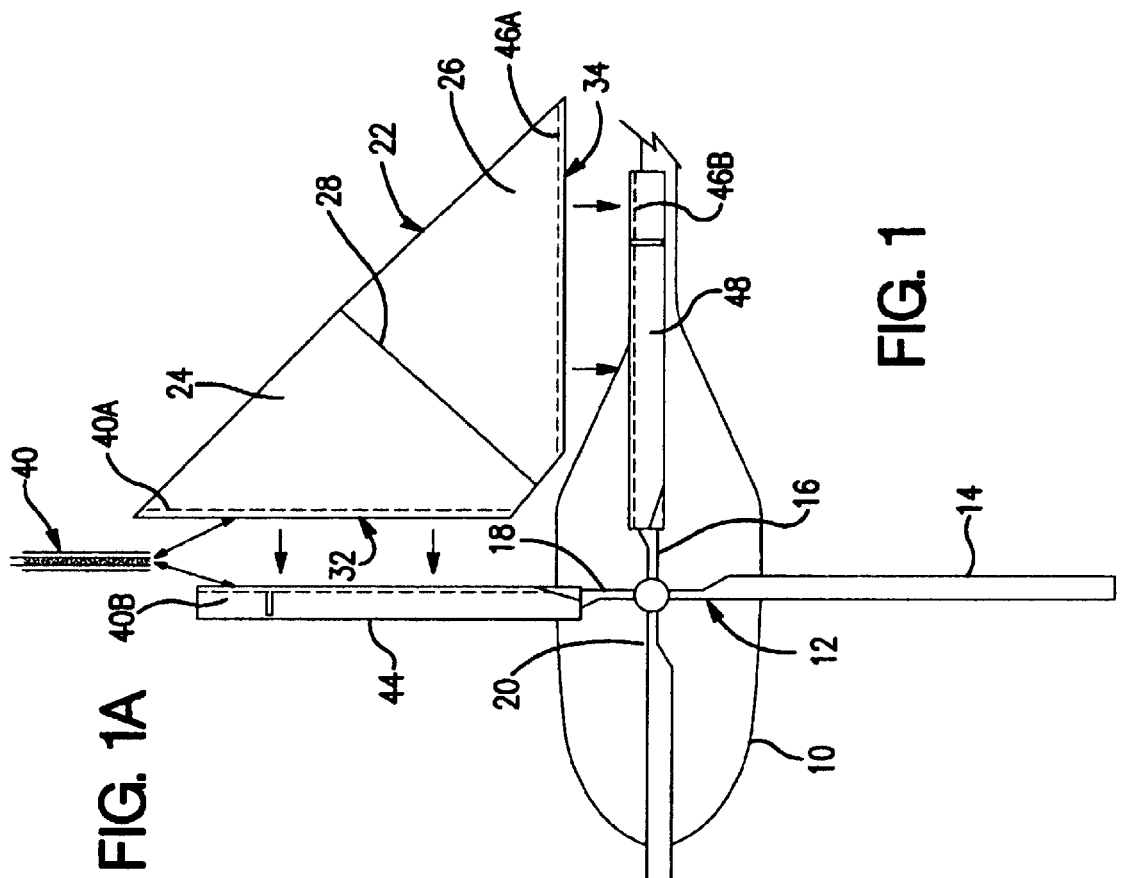
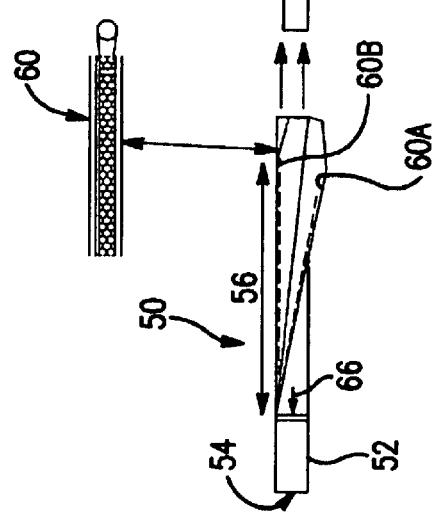

HELICOPTER PROTECTION SYSTEM

BACKGROUND OF THE INVENTION

This invention relates to a system for protecting a helicopter, or at least parts thereof, from the elements and particularly from the sun.

U.S. Pat. No. 4,613,096 discloses a helicopter protector which uses a sheet of protective covering material which is draped over a main rotor blade of a helicopter and which is pegged to the ground to provide a tent-like structure. This does provide a degree of protection although it is somewhat cumbersome to make use of the protector. Another disadvantage is that the protector is primarily intended for use with a two blade rotor.

SUMMARY OF THE INVENTION

The invention provides, in the first instance, a protection system for a helicopter with at least three main rotor blades which includes at least one flexible panel with first and second edges, and first and second attachment devices, on the said first and second edges respectively, for engagement with two of the rotor blades so that the panel extends between these rotor blades.

The panel may be supported by, and extend between, the rotor blades substantially in a horizontal orientation. Means may be provided for tensioning the panel, if necessary. Such tensioning means may for example include elastic devices such as springs, rubber strips or the like which impart a degree of tension between at least parts of the panel and relatively fixed structure such as a rotor blade or an adjacent panel.

Each attachment device, on the panel, may take on any appropriate form. The invention is not limited in this regard. For example each attachment device may comprise a plurality of spaced rings or loops which are engaged with a respective blade. Preferably however each attachment device includes an elongate sock in which a respective blade is at least partly received.

As used herein the word "sock" includes a tubular-like structure into which at least a portion of a blade is insertable. The tubular structure may be continuous in the sense that it is formed from sheet material or it may be discontinuous in the sense that it is formed from a number of bands or loops through which a blade is threaded.

Each sock may include a fastener for closing the sock along an elongate path, or opening the sock along the said elongate path.

The fastener may take on any suitable form and the invention is not limited in this regard. Preferably the fastener is selected from the following: at least one zip fastener; a plurality of spaced fixing devices; at least one hook and pile fastener eg. of the type sold under the trade mark Velcro.

In a preferred embodiment of the invention the fastener comprises an elongate zip fastener which extends substantially the entire length of the sock. The zip fastener, when released, opens the sock along the elongate path and, as the zip fastener is closed, the sock is closed thereby enveloping the blade inside the sock.

The panel may be formed integrally with at least one of the attachment devices. Thus the panel may be formed integrally with a sock or with both socks. Alternatively the panel is detachably engagable with at least one of the attachment devices.

In a preferred form of the invention each attachment device comprises a respective sock which is separable from the panel. Each sock includes an elongate fastener such as a zip fastener Each sock is then separately engagable with a respective blade. Each sock, in turn, is engagable with a respective edge of the panel using a further fastener which, preferably, is selected from the following: at least one zip fastener; a plurality of spaced fixing devices; at least one hook and pile fastener such as that sold under the name Velcro.

Where use is made of spaced fixing devices these may be in the nature of buttons, hook and eye formations, small zips, fastening bands or loops, or any other suitable fixing device which can be engaged with a rotor blade.

Preferably each panel includes a safety shear strip. The shear strip may take on any suitable form and, in a generalised sense, comprises or includes a line or lines of weakness. The panel may for example comprise two sections which are joined to one another by the shear strip using a suitable fastener or fasteners such as small lengths of hook and pile strips (Velcro strips) or the like.

The invention extends, in the second instance, to a protection system for a helicopter with at least three main rotor blades which includes a first sock in which a first blade is locatable, a second sock in which a second blade is locatable, and a flexible cover which is secured to, and which extends between, the first and second socks.

The invention also extends to a panel for use in a helicopter protection system which includes a cover made from a flexible sheet material, a safety shear strip which extends between two sections of the cover, and first and second attachment devices on respective first and second edges of the cover.

BRIEF DESCRIPTION OF THE DRAWINGS

The invention is further described by way of example with reference to the accompanying drawings in which:

FIG. 1 is a schematic plan view illustrating a helicopter to which a protective flexible panel is being fitted, FIGS. 1(a) and 1(b) respectively are inset drawings to FIG. 1 showing different aspects of the protection system.

DESCRIPTION OF PREFERRED EMBODIMENT

Figure 2:
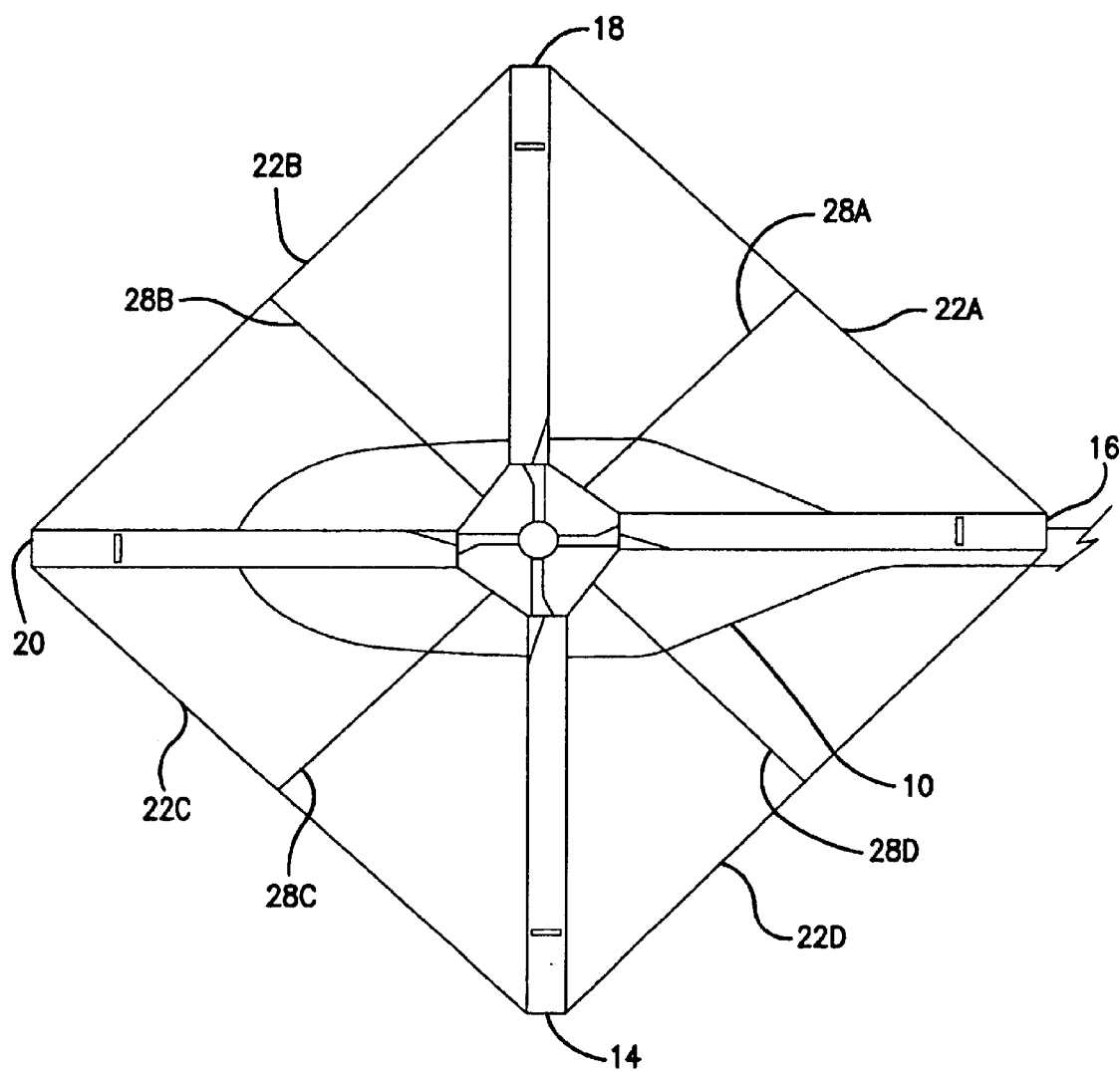
FIG. 2 shows the helicopter of FIG. 1 with protective panels engaged with all of the rotor blades.

FIG. 1 of the accompanying drawings illustrates in plan a helicopter 10 with a main rotor 12 which includes, in this case, four main rotor blades 14, 16, 18 and 20 respectively.

FIG. 1 also illustrates a flexible panel 22 which comprises a cover made from a flexible sheet material and which consists of a first section 24 and a second section 26. The first and second sections are joined together by means of a safety shear strip 28.

The shear strip 28 is, in essence, a line of weakness. The shear strip may take on any appropriate form. In one example of the invention the shear strip is formed by perforating or weakening the panel along the line 28 in such a way that when the panel is subjected to a predetermined force it will tear or shear along the line 28. In another form of the invention the sections 24 and 26 are separately formed and are attached to one another at regular intervals by means of small strips of material 30 which embody interengagable hook and pile formations eg. of the type sold under the name Velcro. This type of material is known in the art and consequently is not further described herein.

The panel 22 has a first edge 32 and a second edge 34 which, in this example, is substantially at right angles to the first edge.

An inset drawing FIG. 1(a) to FIG. 1 illustrates an elongate zip fastener 40. The zip fastener is of a robust construction and, generally, is of a type used in tents, camping equipment and the like in that the fastener has two halves which are completely detachable from each other. One half of the fastener extends along the first edge 32 and is indicated by means of a dotted line marked 40A. The other half of the fastener, designated 40B, is attached to a sock 44 which, in turn, is engaged with the blade 18. A second zip fastener has components or halves 46A and 46B respectively which are attached to the second edge 34 and to a sock 48 which is engaged with the blade 16.

In an inset drawing FIG. 1(b) the reference numeral 50 denotes a sock which is representative of the socks 44 and 48. The sock 50 is made from flexible sheet material which is shaped into a tubular form. One portion of the tubular form is shaped into a closed pocket 52 which is sealed at an outer end 54 and the remainder of the tubular form, designated 56, has sections marked 60A and 60B respectively of a zip fastener 60, fixed to it. By closing the zip 60 the entire sock is formed into a continuous tubular shape. On the other hand when the zip fastener 60 is opened the zip sections 60A and 60B are detached from one another and the tubular sock opened over the length 56 for, as noted, the pocket 56 is a closed pocket with access to the pocket being provided only from the right hand end of the sock as is indicated by means of an arrow marked 66. It should be borne in mind, in this regard, that the end 54 is closed.

The panel 22 can be made from any suitable material according to requirement. For example the panel may be made from shade netting or similar material to provide primary protection against the sun. Lightweight nylon or a similar continuous sheet material can be used to provide protection from the sun and against rain. The panel could be made from infrared signature suppression material to protect the helicopter from detection when on the ground with hot engines, or if other dynamic components of the helicopter generate heat. The sheet material could also be a camouflaged material to protect the helicopter from visual detection when on the ground. Generally these aspects are known in the art and consequently are not further described herein. It is to be noted that the invention is not limited in this regard.

If the protection system is to be installed then, for the given example, one, two, three or four panels may be engaged with respective pairs of rotor blades. Initially a sock is slid over each respective blade. The respective zip 60 is opened to facilitate engagement of the pocket 52 with the outer tip of the blade. The pocket is threaded over the blade end until the tip of the blade abuts the end 54 inside the pocket. The zip fastener 60 is then closed so that the sock closely envelops the blade.

The panel 22 is attached to the sock 44 by means of the zip fastener 40 which ties the zip sections 40A and 40B together thereby securing the panel along the first edge 32 to the sock 44. A similar technique is adopted to secure the second edge of the panel to the sock 48.

The process can be repeated to secure additional panels, not shown, between the blades 18 and 20, between the blades 20 and 14, and between the blades 14 and 16, respectively.

FIG. 2 illustrates the helicopter 10 with panels 22A, 22B, 22C and 22D respectively secured to and between the blades 16 and 18, 18 and 20, 20 and 14, and 14 and 16 respectively. Each panel has a respective safety shear strip 28A, 28B, 28C and 28D. The shear strip is designed, as has been indicated, to part the panel into its respective sections if a predetermined force is exerted on the panel. For example the panel will part in strong winds to prevent damage to the blades or the helicopter control system if the aircraft is not moored and the blades are not picketed.

The protection system is made from lightweight flexible material which, when detached from the blades, can be compactly stowed for storage and transport purposes. The individual panels and socks are readily disassembled merely by opening the relevant zip fasteners. It is not necessary under all conditions to make use of the four panels for one or more panels can be attached to the respective blades according to the amount of protection which is required.

The degree of shade which is afforded by the protection system is substantial, depending on the material from which the panels are made, and reduces the temperature inside the cockpit of the aircraft by a considerable amount. The cockpit equipment is also protected against sun ultraviolet damage and the temperature decrease in the avionics bays is expected to prolong the life of the electronic equipment.

What is claimed is:

1. A protection system for a helicopter with at least three main rotor blades which includes at least one flexible panel with first and second edges, and first and second attachment devices on said first and second edges respectively, for engagement with two of the rotor blades so that the panel extends between these rotor blades, wherein each attachment device includes an elongate sock in which a respective blade is at least partly received, and wherein each sock includes a fastener for closing the sock along an elongate path, or opening the sock along said elongate path.

2. A protection system according to claim 1, wherein the fastener is selected from the following: at least one zip fastener; a plurality of spaced fixing devices; at least one hook and pile fastener.

3. A protection system according to claim 1 wherein the panel is formed integrally with at least one of the attachment devices.

4. A protection system according to claim 1 wherein each panel includes a safety shear strip.

5. A protection system for a helicopter with at least three main rotor blades which includes at least one flexible panel with first and second edges, and first and second attachment devices on said first and second edges respectively, for engagement with two of the rotor blades so that the panel extends between these rotor blades, wherein each attachment device includes an elongate sock in which a respective blade is at least partly received, wherein the panel is detachably engagable with at least one of the attachment devices, and wherein the panel is detachably engagable with at least one of the attachment devices using one of the following: at least one zip fastener; a plurality of spaced fixing devices; at least one hook and pile fastener.

* * * * *

UNITED STATES PATENT AND TRADEMARK OFFICE
CERTIFICATE OF CORRECTION

PATENT NO. : 6,854,475 B2
DATED : February 15, 2005
INVENTOR(S) : Johan Herman Slabbert It is certified that error appears in the above-identified patent and that said Letters Patent is hereby corrected as shown below:

<u>Title page,</u>
Insert Item:
-- [30] Foreign Application Priority Data
Jan. 20, 2000 (ZA)......................... 2000/0225
March 24, 2000 (ZA) ..................... 2000/1495 --.

Signed and Sealed this

Third Day of May, 2005

JON W. DUDAS
*Director of the United States Patent and Trademark Office*